UNITED STATES PATENT OFFICE.

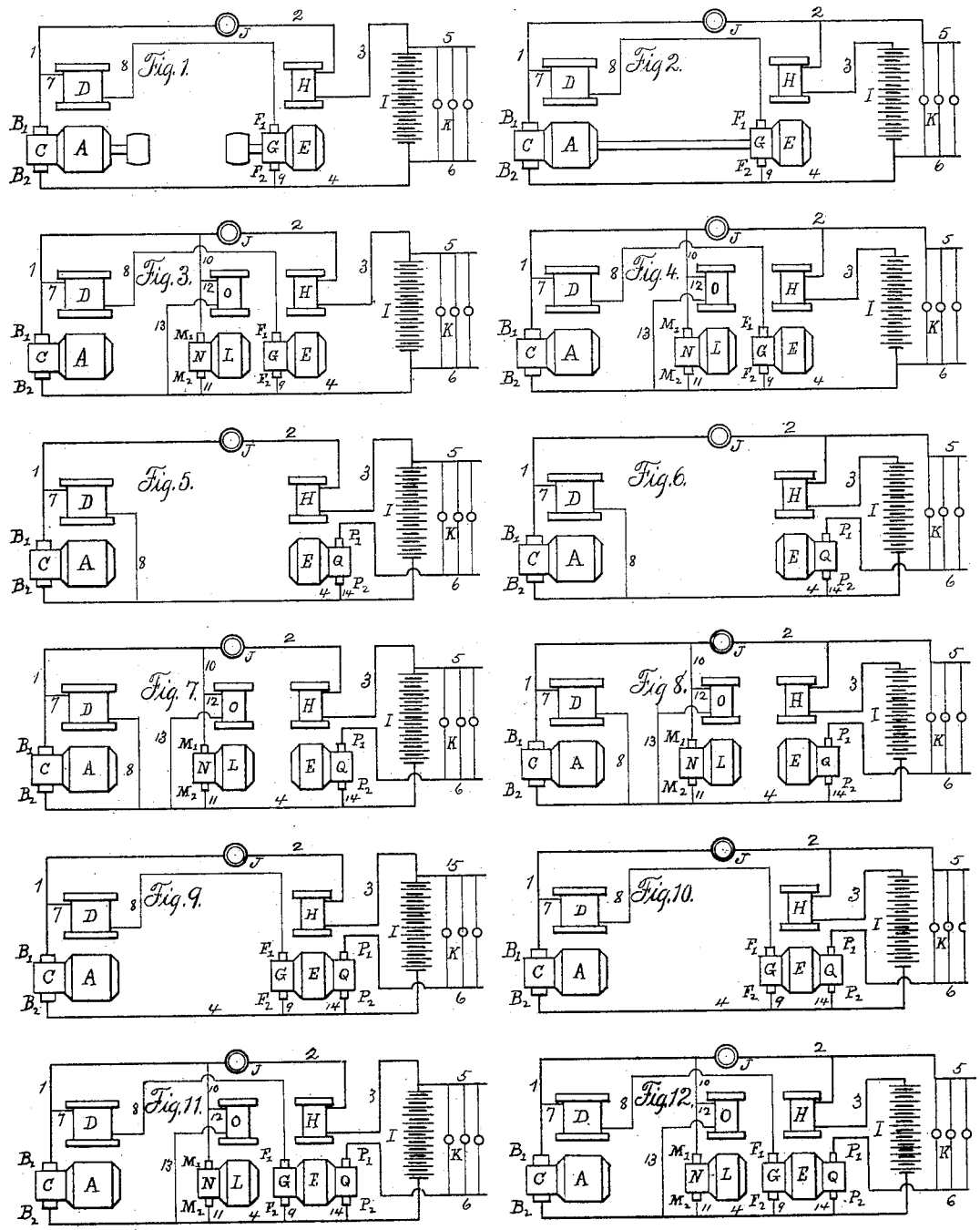

WILLIAM LORD BLISS, OF BROOKLYN, NEW YORK.

SYSTEM OF ELECTRICAL DISTRIBUTION.

SPECIFICATION forming part of Letters Patent No. 601,233, dated March 29, 1898.

Application filed October 14, 1897. Serial No. 655,205. (No model.)

*To all whom it may concern:*

Be it known that I, WILLIAM LORD BLISS, a citizen of the United States, and a resident of Brooklyn, in the county of Kings and State of New York, have invented certain new and useful Improvements in a System of Electrical Distribution, of which the following is a specification.

The object of my invention is to provide a method of automatic regulation in a system of electrical distribution wherein a dynamo-electric machine or generator driven at varying speeds from an intermittent source of power furnishes the electrical energy for operating translating devices in a service-circuit, or which by storing in addition electrical energy by charging a suitable storage battery or electric accumulator enables said translating devices to be operated continuously or at will. If in a system of electrical distribution as described the variation in the speed of the dynamo be considerable, it is in general advisable to adopt some method of regulation which while permitting the dynamo to operate at a low speed will also so control the output of the same at a high speed that no injury to the machine or to apparatus in circuit with it will result. If also the translating devices operated by the dynamo or by the electrical energy stored by the dynamo in accumulators for that purpose be of such a nature that a constant electromotive force should be maintained at their terminals, then further means must be supplied to secure such a result. Systems of the nature described are met with in the electric lighting of railway-trains, where a dynamo deriving its motion from the car on which it is located or some part thereof is employed for charging storage batteries which are carried on said car for the purpose of illuminating the same and also in electric-lighting plants operated by windmills or by any source of varying intermittent power.

I will now describe my invention with reference to the accompanying drawings in such a manner that those skilled in the art may readily make and use the same and afterward point out its novelty in the claims.

Figures 1, 2, 3, and 4 show a main dynamo used for charging a storage battery, which in turn supplies current to translating devices, and an auxiliary dynamo used simply to control the output of the main dynamo. Figs. 1 and 3 show the field of the auxiliary dynamo excited by the total current from the main dynamo, and Figs. 2 and 4 show said field excited by the charging or battery current. Figs. 1 and 2 illustrate mechanical methods of driving the auxiliary dynamo either in conjunction with or independently of the main dynamo. Figs. 3 and 4 illustrate the application of an electric motor for driving the auxiliary dynamo. Figs. 5, 6, 7, and 8 show a main dynamo used for charging a storage battery, which in turn supplies current to translating devices, and an auxiliary dynamo whose function is to maintain the electromotive force impressed upon the translating devices constant. The same remarks apply to Figs. 5 and 7 and 6 and 8 with regard to the field connections of the auxiliary dynamo as were made in the case of Figs. 1 and 3 and 2 and 4. Figs. 5 and 6 show the same methods of driving as Figs. 1 and 2, while Figs. 7 and 8 are identical with Figs. 3 and 4 in this respect. Figs. 9, 10, 11, and 12 are respectively combinations of Figs. 1 and 5, 2 and 6, 3 and 7, and 4 and 8. These figures are intended to be diagrammatic and conventional rather than exact representations of actual apparatus.

Similar parts in all the drawings are represented by the same letters or signs.

A is the armature of a direct-current dynamo, designated hereinafter as the "main" dynamo. $B'$ and $B^2$ are the brushes of said dynamo, which bear upon the commutator C. D is the field-magnet coil of said dynamo, wound, preferably, with comparatively fine wire and connected in a shunt or derived circuit with respect to the brushes $B'$ and $B^2$. The armature A is driven in any suitable manner at varying speeds from an intermittent source of power, as above described. When said source of power is the axle of a railway-car, a method of driving the dynamo in question is described by me in United States Letters Patent No. 534,851, dated February 26, 1895.

E is the armature of a direct-current dynamo, hereinafter designated as an "auxiliary" dynamo. $F'$ and $F^2$ are its brushes, bearing on the commutator G. H is the field-magnet coil of said auxiliary dynamo and is preferably wound with a heavy wire of low resistance and is connected directly in series with the brushes B' and B² of armature A.

I is a storage battery or electric accumulator and is connected directly in series with the brushes B' and B² of armature A and coil H.

An automatic switch for opening and closing the circuit through the armature A, coil H, and storage battery I is represented by J. Such an automatic switch is described by me in United States Letters Patent No. 572,627, dated December 8, 1896. (The contact-wedge P and the contact-blocks S' and S² referred to in the patent just cited are superfluous in the first four figures.) The principle upon which the operation of this switch depends was described and disclaimed by J. H. Holmes in United States Letters Patent No. 445,448, dated January 27, 1891.

The circuit comprising brush B', wire 1, switch J, wire 2, coil H, wire 3, storage battery I, wire 4, and brush B², I have designated the "working" circuit.

K represents translating devices, which consist, generally, of incandescent lamps, and hence require that the electromotive force impressed upon them be maintained as nearly constant as possible.

The wires 5 and 6 are designated the "service-circuit."

The armature E of the auxiliary dynamo may be driven independently of the armature A of the main dynamo, as shown in Fig. 1, or it may be mechanically connected to armature A and driven from the same source of power, as illustrated in Fig. 2, or it may be driven by means of an electric motor deriving its power from any suitable source, but preferably from the main dynamo, as indicated in Fig. 3 and hereinafter to be described. Said motor might also be driven by said storage battery I.

Fig. 2 differs from Fig. 1 in that the wire 5 is connected to wire 2, and hence when switch J is closed wire 5 is connected directly to brush B'.

In Fig. 1 the service-circuit, consisting of wires 5 and 6 and translating devices K, constitutes a shunt simply to the storage battery I, whereas in Fig. 2 said service-circuit constitutes a shunt to the storage battery I and coil H.

In Fig. 1 the total current supplied by the armature A of the main dynamo magnetizes coil H, while in Fig. 2 only that part of the total current which charges the storage battery I magnetizes coil H.

Figs. 1, 3, 5, 7, 9, and 11 are similar with respect to the manner in which coil H is connected, while the same holds true of Figs. 2, 4, 6, 8, 10, and 12.

The electric motor referred to in Fig. 3 consists of an armature L, brushes M' and M², commutator N, and field-magnet coil O, which is here represented as wound with fine wire and connected as a shunt to the brushes M' and M². This electric motor may be made to drive the auxiliary dynamo by means of any suitable mechanical connection therewith. I do not confine myself to this type of motor, since a series motor with coarse-wire field-coil might be similarly employed. I prefer, however, the shunt-wound motor. As the electric motor just described is employed simply to furnish the power necessary to drive the auxiliary dynamo, no special description of its action will be given. There are a variety of ways in which said motor could be wound and connected, and I do not confine myself to any one of them.

The electrical action of the apparatus shown in Figs. 1, 2, 3, and 4 is as follows: As soon as the armature A of the main dynamo attains sufficient speed to render its electromotive force equal to or slightly greater than that of the storage battery I the switch J closes. At this juncture no current, or only a slight current, flows from the dynamo whose armature is A to the storage-battery I. If the service-circuit is complete, the translating devices K will receive current principally from the storage battery I and partly from the armature A. Current will flow, however, from brush B' through coil D, wire 8, brush F', armature E, brush F², wire 9, wire 4, and brush B², thus magnetizing the coil D. As long as no current passes from armature A to storage battery I through coil H the armature E will not produce an electromotive force, although it is supposed to be running. When the armature A runs at a high speed, its electromotive force is thereby raised and a greater current flows through the working circuit and coil H. Armature E now generates an electromotive force which (the connections being properly made) opposes the flow of current through coil D and armature E. By suitably proportioning the various parts of this apparatus it is apparent that the current flowing through coil H can be limited to any value desired to correspond with a predetermined limit of speed in the armature A. In Figs. 1 and 3 the total current of armature A is thus regulated, while in Figs. 2 and 4 that portion of the total current of armature A which I shall call the "charging-current" is thus confined within limits. Thus it is further apparent that the arrangement of apparatus shown in Figs. 1, 2, 3, and 4 will completely regulate within comparatively narrow limits the output of a dynamo whose speed fluctuates through a wide range.

No attempt so far has been made to maintain constant the electromotive force impressed upon the translating devices. In fact the electromotive force impressed upon the translating devices when the latter are connected directly to the terminals of the storage-battery must rise when the electromotive force at said storage-battery terminals is raised in order that a charging-current may be forced through it.

Figs. 5, 6, 7, and 8 show variations of a method by which the impressed electromotive force on the translating devices in the service-circuit is maintained practically constant. It will be noted in Figs. 5, 6, 7, and 8 that the shunt field-coil D of the main dynamo is connected directly across the brushes B' and B², nothing else being included in its circuit. For the sake of adjustment a variable resistance or rheostat might be included in the circuit of the coil D in all the figures.

In Figs. 5, 6, 7, and 8 is shown an auxiliary dynamo whose armature is represented by E, brushes by P' and P², commutator by Q, and field-magnet coil wound with coarse wire by H. This auxiliary dynamo may be driven as described above. It will be noted that the wire 6 of the service-circuit is connected to the brush P'. Hence the current supplied to the translating devices K must pass through armature E.

The action of the apparatus in Figs. 5, 6, 7, and 8 is as follows: No attempt is made to control the output of the armature A of the main dynamo, but otherwise the action of said main dynamo is exactly similar to that previously described in connection with Figs. 1, 2, 3, and 4. The current flowing from the armature A through coil H and storage battery I magnetizes said coil H and charges said storage battery I. This charging process raises the electromotive force impressed upon the storage battery I. At the same time, however, the armature E under the influence of coil H generates an electromotive force which (the connections being properly made) opposes the flow of current through the translating devices, provided, of course, the service-circuit is complete. By properly proportioning the parts of this apparatus a practically constant electromotive force can be maintained on the translating devices.

In Figs. 5 and 7 the total current of armature A magnetizes coil H, while in Figs. 6 and 8 only the charging-current affects said coil. Whenever the demand for current by the translating devices is greater than the main dynamo is capable of supplying by virtue of a reduction of its speed the deficiency would be made up by the storage battery, and when the main dynamo was entirely disconnected from the system the whole current for the translating devices would be supplied by the storage battery. In such cases when coil H is connected, as shown in Figs. 2, 4, 6, 8, 10, and 12, the current would be reversed in coil H, and consequently the electromotive force at brushes P' and P² in Figs. 6, 8, 10, and 12 would be added to that of the storage battery I, which is not desirable. The switch J could therefore be so adjusted that it should never be closed when conditions existed that would cause a reversal of current through coil H, and when open said switch should short-circuit coil H by means of contact-wedge P and contact-blocks S' and S², as shown in United States Letters Patent No. 572,627, dated December 8, 1896, by connecting said blocks S' and S² with the terminals of coil H. On the other hand, if wire 10 in Figs. 4, 8, and 12 be connected to the contact-wedge Q of the switch referred to by a flexible conductor then it will not be necessary to short-circuit coil H in order to prevent an electromotive force being generated by armature E at brushes P' and P², for by breaking the circuit through the armature L the auxiliary dynamo would be brought to a stop when the switch J opened. Any other means of stopping the auxiliary dynamo in the service-circuit or short-circuiting its armature might be employed. The short-circuiting of the coil H by the opening of the switch J is, however, a positive advantage, since it removes whatever resistance said coil H possesses from the service-circuit.

Figs. 9, 10, 11, and 12 are respectively combinations of Figs. 1 and 5, 2 and 6, 3 and 7, and 4 and 8. The armature E of the auxiliary dynamo is shown in Figs. 9, 10, 11, and 12 as having two windings connected, respectively, to the commutators G and Q. The action of the apparatus in these last-mentioned figures is in no way different from that in the previous figures already described. It is evident that by thus combining the two methods I produce a complete system in which the output of the main dynamo is regulated or confined within predetermined limits and the electromotive force impressed upon the translating devices is maintained constant.

I wish it understood that in combining the two methods, the first of which is shown in Figs. 1, 2, 3, and 4 and the second in Figs. 5, 6, 7, and 8, to form the complete arrangement shown in Figs. 9, 10, 11, and 12 I do not limit myself to a common field-coil H and an armature E, having two windings. Two separate dynamos suitably driven might be used, the armature of one being in the field-circuit of the main dynamo and that of the other in the service-circuit. Their field-magnets might be excited in a variety of ways.

What I consider novel is the introduction directly into the field-circuit of the main dynamo of a counter electromotive force, and also the placing in series with the translating devices in the service-circuit of another counter electromotive force, and, further, the methods of winding, connecting, and controlling the fields under whose influence said electromotive forces are generated, whereby said electromotive forces are correctly proportioned to control, respectively, the output of the main dynamo and preserve constant the electromotive force impressed upon the translating devices. It will be apparent to all electricians that in this system no waste of energy takes place except that due to unavoidable internal losses, the auxiliary dynamo and motor combination acting simply as a transformer or inverted "booster."

My chief reason for continuing the two auxiliary dynamos in one machine having a common field and common armature with two windings and two commutators is that I consider such a machine quite as effective and for economic considerations far preferable to the separate arrangement. Of course it is possible to vary my design by placing the motor-winding on the same armature with one or both of the windings of the armatures of the auxiliary dynamos, as in the ordinary motor-generator; but I do not consider such an arrangement advisable. In general the motor should be a separate machine with independent armature and field. The motor and auxiliary dynamo may be combined in one structure, which is most desirable. A series-wound main dynamo might also be employed, in this case making the armature of the auxiliary dynamo with brushes $F'$ and $F^2$ a shunt to the series coil of said main dynamo. The electromotive force of the auxiliary dynamo would be made to oppose the main electromotive force and gradually decrease as the speed and output of the main dynamo increased, and thus shunt current from the main series coil, thus weakening the field of the main dynamo. A differential fine winding on the coil H, in addition to its coarse wire and connected to a source of approximately constant electromotive force, would produce the result required. A separately-excited main dynamo might also be employed.

The storage battery does not constitute an indispensable element in the application of my invention. The main dynamo may operate translating devices without a storage battery or may charge a storage battery alone. The complete combination furnishes a reliable system of electric car-lighting by means of incandescent lamps, a storage battery, and an axle-driven dynamo.

If the main dynamo has any difficulty in exciting itself as a shunt-wound machine, the terminals of the coil D can be connected to the terminals of the storage battery I, or by simply disconnecting wire 7 from wire 1 and connecting it to wire 2 an approximately constant and separate excitation can be secured at all times. A switch, to be operated by hand or automatically, could be used to break the circuit through the coil D when the dynamo was at rest.

In this specification the armature of the main dynamo, and also that of the auxiliary dynamo, is supposed to run in one direction only. If the direction of rotation suffer reversal, means must be provided to maintain constant the polarity of the brushes $B'$ and $B^2$ and also of $F'$ and $F^2$ and, further, of $P'$ and $P^2$. In general brushes $B'$ and $B^2$ would be the only ones requiring such attention. I can accomplish this by means of the device on which I obtained United States Letters Patent No. 525,836, dated September 11, 1894. If the auxiliary dynamo be driven by an electric motor, as I have elsewhere indicated, no reversal of direction of rotation would take place in the armature of said auxiliary dynamo.

What I claim as my invention, and what I desire to secure by Letters Patent, is—

1. The herein-described method of controlling the current and electromotive force of a dynamo, consisting in demagnetizing the field of said dynamo, as the speed and electromotive force of said dynamo increase, by means of an auxiliary counter electromotive force, which increases as the speed and electromotive force of said dynamo increase and which is connected in series with the primary exciting field-coil of said dynamo.

2. The herein-described method of maintaining constant the electromotive force impressed upon translating devices which derive their energy from a storage battery, said storage battery being arranged so as to be charged, simultaneously with the operation of said translating devices, by a dynamo whose speed and electromotive force vary, consisting in generating in the circuit of said translating devices a counter electromotive force, which shall vary from zero to a maximum coincidentally with the variation of the electromotive force impressed upon the terminals of said storage battery by said dynamo, from a value equal to that of the electromotive force of said storage battery when the charging-current is zero to such a value as will enable the maximum charging-current to be forced through said storage battery by said dynamo.

3. The herein-described method of maintaining constant the electromotive force impressed upon translating devices which derive their energy from a storage battery, said storage battery being arranged so as to be charged, simultaneously with the operation of said translating devices, by a dynamo, consisting in generating in the circuit of said translating devices a counter electromotive force of such a value, that when said counter electromotive force is deducted from the electromotive force impressed upon said storage battery by said dynamo during said charging process, the remaining electromotive force shall be constant and equal to the electromotive force impressed upon said translating devices by said storage battery when said charging process shall have been discontinued.

4. The herein-described method of maintaining constant the electromotive force impressed upon translating devices which derive their energy from a storage battery, said storage battery being arranged so as to be charged simultaneously with the operation of said translating devices by a dynamo, consisting in generating in the circuit of said translating devices a counter electromotive force which is approximately proportional to the charging-current flowing through said storage battery.

5. The herein-described method of maintaining constant the electromotive force impressed upon translating devices which derive their energy from a storage battery said storage battery being arranged so as to be charged simultaneously with the operation of said translating devices by a dynamo, consisting in generating in the circuit of said translating devices a counter electromotive force which is approximately proportional to the sum of the charging-current flowing through said storage battery and the current flowing through said translating devices.

6. The combination in a system of electrical distribution of a main dynamo, a shunt field-coil on said main dynamo, a storage battery connected so as to be charged by said main dynamo, and an auxiliary dynamo whose armature is connected in series with the shunt field-coil on said main dynamo, and so arranged that the electromotive force of the armature of said auxiliary dynamo opposes the flow of current through the shunt field-coil of said main dynamo for the purpose as herein set forth.

7. The combination in a system of electrical distribution of a main dynamo, a shunt field-coil on said main dynamo, a storage battery connected so as to be charged by said main dynamo, translating devices operated by said storage battery, and an auxiliary dynamo connected in series with the shunt field-coil of said main dynamo, and so arranged that the electromotive force of said auxiliary dynamo opposes the flow of current through the shunt field-coil of said main dynamo for the purpose as herein set forth.

8. The combination in a system of electrical distribution of a main dynamo, a storage battery connected so as to be charged by said main dynamo, translating devices operated by said storage battery and an auxiliary dynamo connected in series with said translating devices, and so arranged that the electromotive force of said auxiliary dynamo opposes the flow of current through said translating devices for the purpose as herein set forth.

9. The combination in a system of electrical distribution of a main dynamo, a shunt field-coil on said main dynamo, a storage battery connected so as to be charged by said main dynamo, translating devices operated by said storage battery and an auxiliary dynamo connected in series with said translating devices and so arranged that the electromotive force of said auxiliary dynamo opposes the flow of current through said translating devices for the purpose as herein set forth.

10. The combination in a system of electrical distribution of a main dynamo, a shunt field-coil on said main dynamo, a storage battery connected so as to be charged by said main dynamo, translating devices operated by said storage battery and an auxiliary dynamo, the armature of which is provided with two windings one of said windings being in series with the shunt field-coil of said main dynamo and the other of said windings being in series with said translating devices and so arranged that the electromotive forces of said windings oppose respectively the flow of current through the shunt field-coil of said main dynamo and through said translating devices as and for the purpose as herein set forth.

11. The combination in a system of electrical distribution of a main dynamo, a shunt field-coil on said main dynamo, a storage battery connected so as to be charged by said main dynamo, translating devices operated by said storage battery, two auxiliary dynamos one of said auxiliary dynamos being in series with the shunt field-coil of said main dynamo and the other of said auxiliary dynamos being in series with said translating devices and so arranged that the electromotive forces of said auxiliary dynamos oppose respectively the flow of current through the shunt field-coil of said main dynamo and said translating devices as and for the purpose herein set forth.

12. The combination in a system of electrical distribution of a main dynamo having a shunt field-coil, an auxiliary dynamo having a coarse-wire field-coil, a storage battery, and a working circuit including connected in series the armature of said main dynamo, the coarse-wire field-coil of said auxiliary dynamo and said storage battery, the armature of said auxiliary dynamo being connected in series with the shunt field-coil of said main dynamo, and so arranged that the electromotive force of the armature of said auxiliary dynamo opposes the flow of current through the shunt field-coil of said main dynamo, substantially as herein described.

13. The combination in a system of electrical distribution of a main dynamo having a shunt field-coil, an auxiliary dynamo having a coarse-wire field-coil, a storage battery, a working circuit including connected in series the armature of said main dynamo, the coarse-wire field-coil of said auxiliary dynamo and said storage battery, and a service-circuit containing translating devices connected as a shunt to said storage battery, the armature of said auxiliary dynamo being connected in series with the shunt field-coil of said main dynamo, and so arranged that the electromotive force of the armature of said auxiliary dynamo opposes the flow of current through the shunt field-coil of said main dynamo, substantially as herein described.

14. The combination in a system of electrical distribution of a main dynamo having a shunt field-coil, an auxiliary dynamo having a coarse-wire field-coil, a storage battery, a working circuit including connected in series the armature of said main dynamo, the coarse-wire field-coil of said auxiliary dynamo and said storage battery, and a service-circuit containing translating devices connected as a shunt to said storage battery and the coarse-wire field-coil of said auxiliary dynamo, the armature of said auxiliary dynamo being connected in series with the shunt field-coil of said main dynamo, and so arranged that the electromotive force of the armature of said auxiliary dynamo opposes the flow of current through the shunt field-coil of said main dynamo, substantially as herein described.

15. The combination in a system of electrical distribution of a main dynamo having a shunt field-coil, an auxiliary dynamo having a coarse-wire field-coil, a storage battery, a working circuit including connected in series the armature of said main dynamo, the coarse-wire field-coil of said auxiliary dynamo and said storage battery, and a motor connected across the terminals of said main dynamo and fitted for driving said auxiliary dynamo, the armature of said auxiliary dynamo being connected in series with the shunt field-coil of said main dynamo, and so arranged that the electromotive force of the armature of said auxiliary dynamo opposes the flow of current through the shunt field-coil of said main dynamo, substantially as herein described.

16. The combination in a system of electrical distribution of a main dynamo having a shunt field-coil, an auxiliary dynamo having a coarse-wire field-coil, a storage battery, a working circuit containing connected in series the armature of said main dynamo, the coarse-wire field-coil of said auxiliary dynamo and said storage battery, a service-circuit containing translating devices connected as a shunt to said storage battery, and a motor connected across the terminals of said main dynamo and fitted for driving said auxiliary dynamo, the armature of said auxiliary dynamo being connected in series with the shunt field-coil of said main dynamo, and so arranged that the electromotive force of the armature of said auxiliary dynamo opposes the flow of current through the shunt field-coil of said main dynamo substantially as herein described.

17. The combination in a system of electrical distribution of a main dynamo having a shunt field-coil, an auxiliary dynamo having a coarse-wire field-coil, a storage battery, a working circuit containing connected in series the armature of said main dynamo, the coarse-wire field-coil of said auxiliary dynamo and said storage battery, a service-circuit containing translating devices connected as a shunt to said storage battery and the coarse-wire field-coil of said auxiliary dynamo, and a motor connected across the terminals of said main dynamo and fitted for driving said auxiliary dynamo, the armature of said auxiliary dynamo being connected in series with the shunt field-coil of said main dynamo, and so arranged that the electromotive force of the armature of said auxiliary dynamo opposes the flow of current through the shunt field-coil of said main dynamo substantially as herein described.

18. The combination in a system of electrical distribution of a main dynamo having a shunt field-coil, an auxiliary dynamo having a coarse-wire field-coil, a storage battery, a working circuit containing connected in series the armature of said main dynamo, the coarse-wire field-coil of said auxiliary dynamo and said storage battery, and a service-circuit containing translating devices connected in series with the armature of said auxiliary dynamo as a shunt to said storage battery, and so arranged that the electromotive force of the armature of said auxiliary dynamo opposes the flow of current through said translating devices, substantially as herein described.

19. The combination in a system of electrical distribution of a main dynamo having a shunt field-coil, an auxiliary dynamo having a coarse-wire field-coil, a storage battery, a working circuit containing connected in series the armature of said main dynamo, the coarse-wire field-coil of said auxiliary dynamo and said storage battery, and a service-circuit containing translating devices connected in series with the armature of said auxiliary dynamo as a shunt to said storage battery and the coarse-wire field-coil of said auxiliary dynamo, and so arranged that the electromotive force of the armature of said auxiliary dynamo opposes the flow of current through said translating devices substantially as herein described.

20. The combination in a system of electrical distribution of a main dynamo having a shunt field-coil, an auxiliary dynamo having a coarse-wire field-coil, a storage battery, a working circuit containing connected in series the armature of said main dynamo, the coarse-wire field-coil of said auxiliary dynamo and said storage battery, a service-circuit containing translating devices connected in series with the armature of said auxiliary dynamo as a shunt to said storage battery, and a motor connected across the terminals of said main dynamo and fitted for driving said auxiliary dynamo, and so arranged that the electromotive force of the armature of said auxiliary dynamo opposes the flow of current through said translating devices substantially as herein described.

21. The combination in a system of electrical distribution of a main dynamo having a shunt field-coil, an auxiliary dynamo having a coarse-wire field-coil, a storage battery, a working circuit containing connected in series the armature of said main dynamo, the coarse-wire field-coil of said auxiliary dynamo and said storage battery, a service-circuit containing translating devices connected in series with the armature of said auxiliary dynamo as a shunt to said storage battery and the coarse-wire field-coil of said auxiliary dynamo, and a motor connected across the terminals of said main dynamo and fitted for driving said auxiliary dynamo, and so arranged that the electromotive force of the armature of said auxiliary dynamo opposes the flow of current through said translating devices substantially as herein described.

22. The combination in a system of electrical distribution of a main dynamo having a shunt field-coil, an auxiliary dynamo having a coarse-wire field-coil and an armature provided with two windings, a storage battery, a working circuit including connected in series the armature of said main dynamo, the coarse-wire field-coil of said auxiliary dynamo and said storage battery, and a service-circuit containing translating devices connected in series with one winding of the armature of said auxiliary dynamo as a shunt to said storage battery, the other winding of the armature of said auxiliary dynamo being connected in series with the shunt field-coil of said main dynamo, and so arranged that the electromotive forces of the two windings of the armature of said auxiliary dynamo respectively oppose the flow of current through said translating devices and the shunt field-coil of said main dynamo, substantially as herein described.

23. The combination in a system of electrical distribution of a main dynamo having a shunt field-coil, an auxiliary dynamo having a coarse-wire field-coil and an armature provided with two windings, a storage battery, a working circuit including connected in series the armature of said main dynamo, the coarse-wire field-coil of said auxiliary dynamo and said storage battery, and a service-circuit containing translating devices connected in series with one winding of the armature of said auxiliary dynamo as a shunt to said storage battery and the coarse-wire field-coil of said auxiliary dynamo, the other winding of the armature of said auxiliary dynamo being connected in series with the shunt field-coil of said main dynamo, and so arranged that the electromotive forces of the two windings of the armature of said auxiliary dynamo respectively oppose the flow of current through said translating devices and the shunt field-coil of said main dynamo substantially as herein described.

24. The combination in a system of electrical distribution of a main dynamo having a shunt field-coil, an auxiliary dynamo having a coarse-wire field-coil and an armature provided with two windings, a storage battery, a working circuit including connected in series the armature of said main dynamo, the coarse-wire field-coil of said auxiliary dynamo and said storage battery, a service-circuit containing translating devices connected in series with one winding of the armature of said auxiliary dynamo as a shunt to said storage battery, and a motor connected across the terminals of said main dynamo and fitted for driving said auxiliary dynamo, the other winding of the armature of said auxiliary dynamo being connected in series with the shunt field-coil of said main dynamo, and so arranged that the electromotive forces of the two windings of the armature of said auxiliary dynamo respectively oppose the flow of current through said translating devices and the shunt field-coil of said main dynamo, substantially as herein described.

25. The combination in a system of electrical distribution of a main dynamo having a shunt field-coil, an auxiliary dynamo having a coarse-wire feed-coil and an armature provided with two windings, a storage battery, a working circuit including connected in series the armature of said main dynamo, the coarse-wire field-coil of said auxiliary dynamo and said storage battery, a service-circuit containing translating devices connected in series with one winding of the armature of said auxiliary dynamo as a shunt to said storage battery and the coarse-wire field-coil of said auxiliary dynamo, and a motor connected across the terminals of said main dynamo and fitted for driving said auxiliary dynamo, the other winding of the armature of said auxiliary dynamo being connected in series with the shunt field-coil of said main dynamo, and so arranged that the electromotive forces of the two windings of the armature of said auxiliary dynamo respectively oppose the flow of current through said translating devices and the shunt field-coil of said main dynamo, substantially as herein described.

Signed at Brooklyn, in the county of Kings and State of New York, this 12th day of October, A. D. 1897.

WILLIAM LORD BLISS.

Witnesses:
JOHN L. BLISS,
G. L. BLISS.